Oct. 11, 1966  L. A. MERDICH  3,277,621
LIGHTWEIGHT PROTECTIVE AUTOMOBILE ENCLOSURE
WITH GUIDING FEATURE
Filed April 20, 1964  2 Sheets-Sheet 1

INVENTOR.
LOUIS A. MERDICH
BY
Francis J. Klempay
ATTORNEY

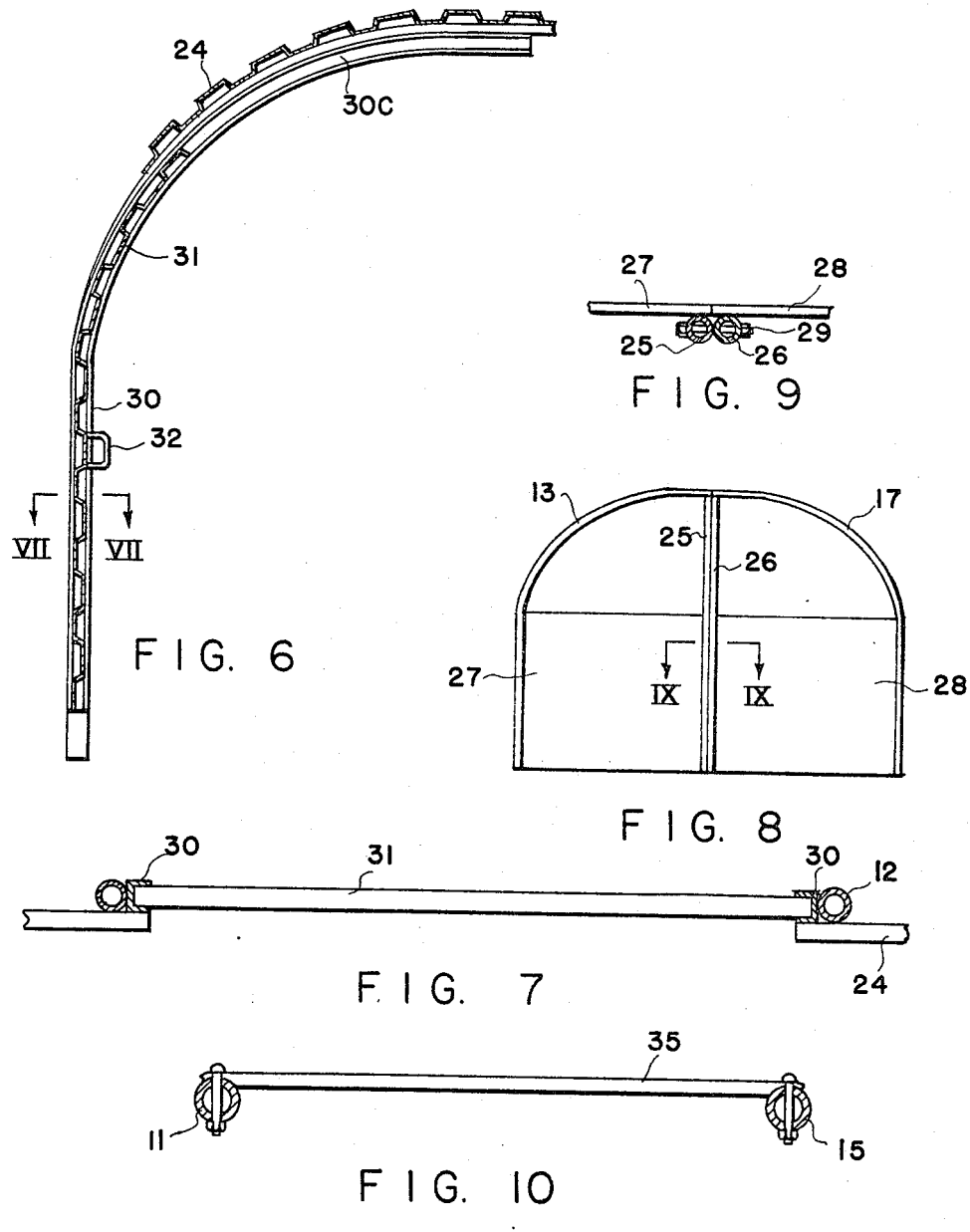

United States Patent Office 3,277,621
Patented Oct. 11, 1966

3,277,621
LIGHTWEIGHT PROTECTIVE AUTOMOBILE ENCLOSURE WITH GUIDING FEATURE
Louis A. Merdich, 1110 Wilshire Drive,
Youngstown, Ohio
Filed Apr. 20, 1964, Ser. No. 361,163
7 Claims. (Cl. 52—86)

This invention relates to a lightweight protective enclosure, particularly designed for motor vehicles, and has as its principal object the provision of such structure which is portable, lightweight, exceedingly inexpensive in cost, capable of being delivered as a "do-it-yourself" kit or in semi-assembled nested condition, and also capable of being very rapidly completed at the location of use. Further, since the completed assembly is only slightly larger than a conventional motor car it is possible to ship the unit fully assembled.

A further object of the invention is the provision of a structure for the above purpose which may be fabricated of readily available stock materials with a minimum of labor and equipment to thereby keep the cost of this structure to the absolute minimum. An ancillary object of the invention is to incorporate in such structure, as an integral part thereof, means for guiding a wheel vehicle into the enclosure and for locating the vehicle within the enclosure whereby the structure is of maximum efficiency as regards its space utilization and may be made of minimum dimensions with respect to the vehicle to be enclosed. Another object of the invention is to provide an improved and simplified entrance door for such structure whereby the door may be readily opened from a position inside the vehicle being housed to permit the door of the vehicle to be opened wide for the egress and ingress of the operator.

The above and other objects and advantages of the invention will become apparent upon consideration of the following specification and the accompanying drawing wherein there is disclosed a preferred embodiment of the invention.

In the drawing:

FIGURES 6 and 7 are elevation and sectional views, respectively, of the door assembly use in the structure of FIGURE 1;

FIGURES 8 and 9 are elevational and sectional views, respectively, of the closed end wall of the structure of FIGURE 1; and FIGURE 10 is a sectional view taken along the line X—X of FIGURE 2.

Figure 1:
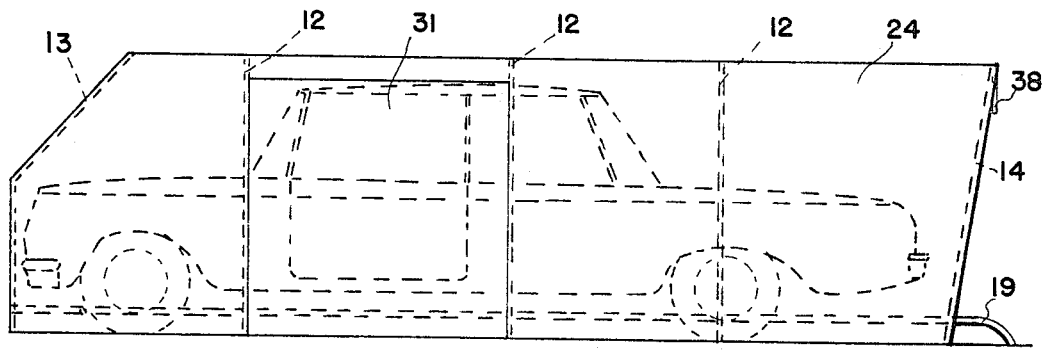
FIGURE 1 is a side elevation of an enclosure constructed in accordance with the principles of the invention.
Figure 3:
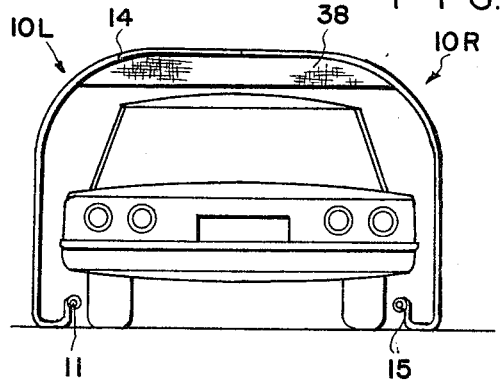
FIGURE 3 is an end elevation of the structure of FIGURES 1 and 2.

The structure of this invention is such that the enclosure is made up of two shell-like halves 10L and 10R, (see FIG. 3), each fabricated of tubing and lightweight sheet metal covering material. Thus, the left half 10L is comprised of a unitary longitudinal length of tubing 11 to which is secured the lower ends of a series (five) of bow-shaped lengths of tubing 12, 13 and 14. The members 12 are located in vertical planes as shown in FIGURE 1, the length 13 is preferably bent rearwardly, and the length 14 lies in a rearwardly inclined plane, all as shown in FIGURE 1. The right half of the structure is built up on the longitudinal tubing length 15 and the bow tubes 16, 17 and 18, these latter bow tubes being merely opposite hand and complementary to the members 12, 13 and 14.

Figure 2:
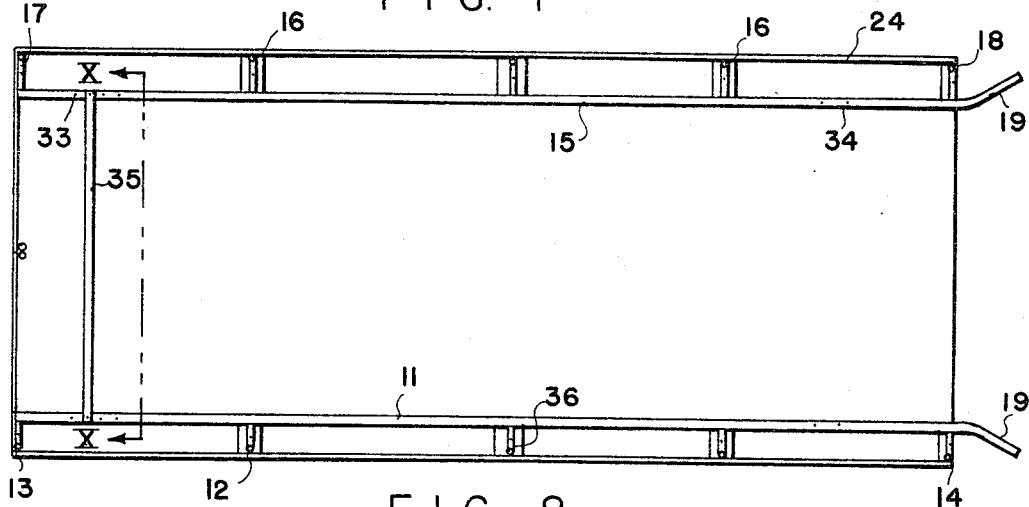
FIGURE 2 is a horizontal section of the enclosure of FIGURE 1.
Figure 4:
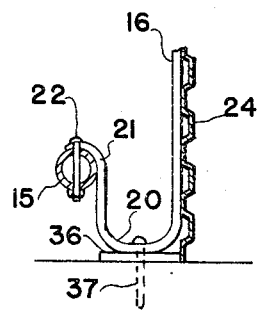
FIGURE 4 is a fragmentary elevation, on enlarged scale, of the structure of FIGURE 3.

All the tubing members 11–18 may be formed of thin-walled electrical conduit suitably coated for reasonable protection against corrosion. Steel tubing is preferable to aluminum tubing, for example, because of its lower cost and somewhat greater strength and stiffness. The longitudinal members 11 and 15 are curved outwardly and downwardly at one of their ends as shown at 19 in FIGURES 1 and 2 to serve as an incoming guide for the tires of the vehicle to be housed. The lower ends of the bow members 12–18 are curved inwardly as shown at 20 in FIGURE 4, thence upwardly and outwardly as at 21 to flattened end portions which are attached to the longitudinal tubes 11 and 15 by suitable fastening means such as the bolts 22. By reference to FIGURES 3, 5 and 8 it will be noted that the bow-shaped tubes 12–18 terminate at the longitudinal midplane of the structure. One of the set—12–14, for example—carry coupling nipples 23 (FIG. 5) which are permanently crimped into the midplane end portions of these members 12–14. Nipples 23 are diametered to fit snugly into the midplane end portions of members 16–18.

Overlying the ribs or bows 12–18 and secured thereto by spring clips or sheet metal screws, not shown herein, is a covering 24 of elongated sheets, preferably of aluminum and preferably of the ribbed or corrugated type to lend strength to the assembly. These sheets, except for the ones which abut against the door opening to be described, are preferably of a length as long as the enclosure to be provided, and it will be understood that the sheet metal thereof is of quite thin gauge to facilitate application and to keep the cost as low as possible. These sheets are applied to the respective halves of the frame assembly so that the two halves can be fabricated and shipped separately as explained above. It should be noted particularly, however, that the shell-like halves can be readily nested for shipment so that an appreciable number of complete enclosures may be loaded at once onto a truck or trailer in a manageable load.

To make the front wall of the enclosure separable into the two halves, I provide a pair of tubular frame members 25 and 26 which are connected at their upper ends to the inner joined ends of the bow members 13 and 17, respectively. These members 25 and 26 receive the ends of outer covering sheet metal panels 27 and 28 which are preferably made of the same material as the covering 14. As indicated in FIGURE 9, the panels 27 and 28 are separated at the longitudinal midplane of the enclosure. They may, however, overlap each other. The meeting end portions of these panels are attached to the members 25 and 26 by any suitable clips or screws, not shown, and these members 25 and 26 may be suitably drilled so that at the time of erection of the enclosure bolts 29 may be utilized to secure them together.

To provide the door in a side wall of the enclosure which may be readily opened to permit the outward swinging movement the door of a vehicle which may be housed in the enclosure, a portion of the covering 24 is terminated at or adjacent two of the frame members 12 as shown in FIGURES 1 and 7. Attached to these frame members are the light inwardly directed channels 30 which at their upper ends are curved inwardly as shown at 30C (FIG. 6) to fit underneath the roof covering of the enclosure. Slideably received within the channels 30 is an expanse 31 of flexible sheet metal which is preferably the same material as the covering material 24. This light-gauge sheet material, which is preferably of aluminum, is rather flexible in a direction normal to the direction of the corrugations as is well understood. A retractable handle, not shown, is secured the outside of the expanse 31 and an operating handle 32 is attached to the inner surface of the expanse to assist in sliding the door upward to open the same from the inside and, if desired, suitable latching means, not shown, may be associated with these handles. Also, roller guides and a lifting spring may be used to facilitate actuation of the door.

Longitudinal guide members 11 and 15 are vertically drilled at a plurality of longitudinally spaced but laterally aligned points 33 adjacent the end wall of the structure and also at other transversely aligned points 4 adjacent the open end of the structure. The enclosure assembly includes a transverse bar 35 which is preferably a length of heavy pipe flattened at its end portions and having drilled apertures in such flattened portions. At time of erection, after the frame members 12–14 are connected to the frame members 16–18 and the guide members 11–15 secured to these various frame members, the bar 35 is used, first, as a gauge to accurately space the side walls of the enclosure. This is accomplished simply by dropping headed bolts down through aligned apertures in the bar 35 and the guide members 11, 15. The bar 35 may be left connected to one of the pairs of apertures 33 to serve as an adjustable stop to limit inward travel of a vehicle into the enclosure.

The enclosure of this invention may be supported on any reasonably flat surface such as a graveled or blacktopped parking lot or even on the ground itself. To support the enclosure structure I provide apertured pads 36 which may be of any suitable material and of variable thickness as required. These pads are placed under the lowermost portions of the frame members 12–14 and 16–18, and suitable stakes 37 may be provided to anchor the assembly to the ground or other supporting surface. The stakes 37 may be hooked at their upper ends to fit over the tubing of these frame members in which case there is no necessity for drilling the frame members as will be understood.

Since the thin gauge sheets making up the covering 24 are customarily sheared to length either before or after corrugating the ends edges thereof may be sharp, and it is accordingly desirable to protect the same about the open end of the enclosure by means of tape or suitable moldings, not shown, as will be understood. At the side opening of the enclosure the problem may be solved by moving the channels outwardly to the planes of the covering 24 and providing the channels with flanges which overlie the end portions of the covering sheets and which are secured to the frame members 12 by sheets metal screws, for example. Alternatively, a protective molding may be secured to the channels 30 shown.

For sake of simplicity and low cost and also because of the low silhouette of the assembly the enclosure of the invention does not include a main entrance door but the inwardly slanting main entrance opening framed by the members 14, 18, provides additional protection from the weather. There is also provided a depending flap 38 which aids in this regard.

Figure 5:
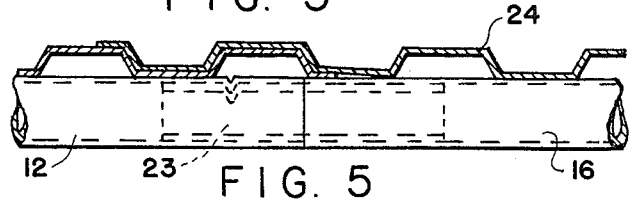
FIGURE 5 is a detailed view of a joint using the structure of FIGURES 1-3.

By referring to FIGURE 5, it should be noted that an extent of the side edge portion of the covering sheet 24 which is carried by one half of the frame overlaps the adjacent side edge portion of the covering sheet which is carried by the other half of the frame. This arrangement not only makes for water-tightness but also keeps the frame members on opposite sides of the structure secured together thereby further simplifying the construction of the assembly.

It should now be apparent that I have provided an improved lightweight protective enclosure which accomplishes the objects initially set out above. The assembly is readily fabricated from standard inexpensive components and since it may be initially assembled in two shell-like halves it is possible to manufacture the same most economically in a central plant and ship the same out to the users in a nested arrangement whereby an economical payload may be provided. A particular advantageous feature of the invention is the use of the longitudinal tubes 11, 15 which serve not only as structural frame members of the assembly but also as guides for entering and leaving vehicles. The smooth rounded nature of the inner edges of these tubes prevents scuffing of the outer side walls of the tires and assists the operator of the vehicle in lightly steering the same without danger of lateral displacement of the side walls of the enclosure. In practice, the component parts of the enclosure are so dimensioned that the guide rails or tubes 11, 15 are spaced sufficiently to accommodate the newer wide-trak vehicles while provision is made for the overhang of the fenders and side walls of the vehicle to make maximum use of the space within the enclosure. As obvious from the drawing, the enclosure as constructed herein need be only a few inches longer, higher, and wider than the length, height and width, respectively, of the vehicle to be accommodated.

Another advantage of the invention is that the parts may be readily and inexpensively fabricated and cut from standard components and shipped out to the user as a "do-it-yourself" kit—the final erection of the unit being a simple task readily within the skill of the average person. The final assembly is, however, quite durable, pleasing in design, and requires no painting or maintenance.

Having thus described my invention what I claim is:

1. A lightweight shell-type protective enclosure adapted to be supported on a flat surface comprising a plurality of longitudinally spaced but transversely extending arch-shaped framing members, longitudinally ribbed metal sheathing secured to said members and forming the top and side walls of said enclosure, and end wall for said enclosure formed of metal sheathing secured to one of the endmost of said members, said members being formed of metal tubing and having lower portions of their side legs bent inwardly and thence upwardly, a pair of longitudinaly extending but transversely spaced and parallel rigid guide members rigidly secured to the upwardly extending end portions of said legs, and means to secure said inwardly bent portions of said legs to said surface.

2. An enclosure according to claim 1 further characterized in that the same has an open end opposite said end wall, said rigid guide members extending outwardly of said open end where they are bent outwardly away from each other to provide an entry guide for a wheel vehicle moving into said enclosure.

3. An enclosure according to claim 1 further characterized in that said framing members are each formed in two parts for separation along a longitudinal midplane of said enclosure and whereby said enclosure may be prefabricated in right and left longitudinal halves, and bridging members carried by the midplane portions of the framing member parts carried by one prefabricated half of the enclosure for rapid connection to the midplane portions of the framing member parts on the other half of the enclosure.

4. An enclosure according to claim 1 further including an opening in one side wall of said enclosure, said opening being framed on opposite sides by channel members which are opened toward each other, and a flexible piece of sheet metal having its side edge portions received in and slideable in said channels whereby said openings may be opened and closed.

5. Structure according to claim 4 further characterized in that said piece of sheet metal is ribbed in a horizontal direction in spanning relation to said channels to provide discrete sections which are in effect hinged to each other to thereby allow said channels to be curved into the outline of the roof of said enclosure.

6. Structure according to claim 1 further including a pair of transversely aligned apertures in said guide members adjacent said end wall and a second pair transversely aligned apertures in said guide members adjacent the opposite end of said enclosure, a rigid transverse member adapted to span said guide members and having apertures in its end portions whereby locating bolts may be passed through both said last mentioned apertures and the apertures of one of said transversely aligned pairs of apertures, the arrangement being such that said rigid transverse member may be utilized both as a guide to properly space either end of said guide members and as a stop to limit the inward movement of a wheel vehicle into said enclosure.

7. An enclosure according to claim 1 further characterized in that the end therof opposite said end wall is open, one of said frame members being at said open end and tilting rearwardly toward its top, and a vertically short flexibile curtain suspended from the upper portion of said last mentioned framing member.

References Cited by the Examiner

UNITED STATES PATENTS

| | | | |
|---|---|---|---|
| 2,282,324 | 5/1942 | Everitt | 52—174 X |
| 3,203,143 | 8/1965 | Swenson | 52—64 |

FRANK L. ABBOTT, *Primary Examiner.*

R. S. VERMUT, *Assistant Examiner.*